US011860638B2

(12) United States Patent
Bautista et al.

(10) Patent No.: US 11,860,638 B2
(45) Date of Patent: *Jan. 2, 2024

(54) AUTONOMOUS FLOOR-CLEANING ROBOT HAVING OBSTACLE DETECTION FORCE SENSORS THEREON AND RELATED METHODS

(71) Applicant: iRobot Corporation, Bedford, MA (US)

(72) Inventors: Dexter Bautista, Arlington, MA (US); Isaac Fowler, Boston, MA (US); Andrew Graziani, Derry, NH (US); Marcus R. Williams, Newton, MA (US); Ping-Hong Lu, Auburndale, MA (US); Erik Schembor, Bedford, MA (US)

(73) Assignee: iRobot Corporation, Bedford, MA (US)

( * ) Notice: Subject to any disclaimer, the term of this patent is extended or adjusted under 35 U.S.C. 154(b) by 397 days.

This patent is subject to a terminal disclaimer.

(21) Appl. No.: 17/065,629

(22) Filed: Oct. 8, 2020

(65) Prior Publication Data

US 2021/0026365 A1 Jan. 28, 2021

Related U.S. Application Data

(63) Continuation of application No. 16/125,051, filed on Sep. 7, 2018, now Pat. No. 10,824,159.

(51) Int. Cl.
*G01L 1/12* (2006.01)
*G05D 1/02* (2020.01)
*G01L 5/00* (2006.01)

(52) U.S. Cl.
CPC ............... *G05D 1/0227* (2013.01); *G01L 1/12* (2013.01); *G01L 5/0052* (2013.01); *G05D 2201/0203* (2013.01)

(58) Field of Classification Search
CPC ............. G05D 1/0227; G05D 2201/0203; G01L 1/12; G01L 5/0052
See application file for complete search history.

(56) References Cited

U.S. PATENT DOCUMENTS 10,375,880 B2 * 8/2019 Morin ..................... B25J 5/007
10,824,159 B2 11/2020 Bautista et al.
(Continued)

OTHER PUBLICATIONS

"U.S. Appl. No. 16/125,051, Ex Parte Quayle Action mailed Aug. 12, 2019", 6 pgs.
(Continued)

*Primary Examiner* — Max H Noori
(74) *Attorney, Agent, or Firm* — Schwegman Lundberg & Woessner, P.A.

(57) ABSTRACT

A mobile cleaning robot can include a robot body, a bumper, and a bumper impact system. The bumper can be connected to and supported by the robot body. The bumper impact system can include a first sensor connected to the body in a first orientation with respect to the body and the bumper. The bumper impact system can include a second sensor connected to the body in a second orientation with respect to the body and the bumper different from the first orientation. The first sensor and the second sensor can together be configured to sense an impact region of the bumper based on a magnitude and a direction of movement of the bumper relative to the robot body.

21 Claims, 10 Drawing Sheets

(56) References Cited

U.S. PATENT DOCUMENTS

| | | | |
|---|---|---|---|
| 2003/0089267 A1* | 5/2003 | Ghorbel | F16L 55/26 |
| | | | 104/138.1 |
| 2008/0276407 A1 | 11/2008 | Schnittman et al. | |
| 2010/0300230 A1* | 12/2010 | Helmer | B25J 9/106 |
| | | | 74/469 |
| 2011/0202175 A1 | 8/2011 | Romanov et al. | |
| 2012/0311810 A1 | 12/2012 | Gilbert, Jr. et al. | |
| 2017/0215337 A1 | 8/2017 | Doughty | |
| 2017/0280960 A1 | 10/2017 | Ziegler et al. | |
| 2017/0332857 A1 | 11/2017 | Nam et al. | |
| 2018/0184583 A1 | 7/2018 | Morin et al. | |
| 2018/0184585 A1* | 7/2018 | Song | A01D 34/74 |
| 2018/0228333 A1* | 8/2018 | Wolfe | A47L 9/2805 |
| 2020/0081447 A1 | 3/2020 | Bautista et al. | |

OTHER PUBLICATIONS

"U.S. Appl. No. 16/125,051, Response filed Oct. 14, 2019 to Ex Parte Quayle Action mailed Aug. 12, 2019", 4 pgs.

"U.S. Appl. No. 16/125,051, Notice of Allowance dated Dec. 17, 2019", 5 pgs.

"U.S. Appl. No. 16/125,051, Non Final Office Action dated Feb. 24, 2020", 7 pgs.

"U.S. Appl. No. 16/125,051, Response filed May 26, 2020 to Non Final Office Action dated Feb. 24, 2020", 11 pgs.

"U.S. Appl. No. 16/125,051, Final Office Action dated Jun. 22, 2020", 7 pgs.

"U.S. Appl. No. 16/125,051, Response filed Aug. 21, 2020 to Final Office Action dated Jun. 22, 2020", 11 pgs.

"U.S. Appl. No. 16/125,051, Notice of Allowance dated Sep. 10, 2020", 7 pgs.

"U.S. Appl. No. 16/125,051, Corrected Notice of Allowability dated Sep. 30, 2020", 2 pgs.

"U.S. Appl. No. 16/125,051, Notice of Allowability dated Oct. 7, 20", 3 pgs.

U.S. Appl. No. 16/125,051, filed Sep. 7, 2018, Autonomous Floor-Cleaning Robot Having Obstacle Detection Force Sensors Thereon and Related Methods.

\* cited by examiner

AUTONOMOUS FLOOR-CLEANING ROBOT HAVING OBSTACLE DETECTION FORCE SENSORS THEREON AND RELATED METHODS

FIELD OF THE INVENTION

The present invention relates to autonomous floor-cleaning robots, and in particular, an autonomous floor-cleaning robot having sensors for obstacle detection and related methods.

BACKGROUND

Robot touch sensors have been incorporated into a robot bumper assembly. Such bumper assemblies are typically rigid, movable bumpers that are spaced away and suspended from the robot chassis. Such bumpers include a rigid outer shell suspended from the robot chassis by a series of hardware, such as pivots/bumper arms and coil springs. The springs absorb the impact energy, but require a high impact force, i.e., require that the bumper deflect by several millimeters to absorb the energy before triggering a switch to indicate that an impact event has occurred.

SUMMARY OF EMBODIMENTS OF THE INVENTION

An autonomous floor-cleaning robot can be used to clean the floor of a home. During a cleaning mission, the autonomous floor-cleaning robot may contact an object, such as a chair, table, or wall. In response to contacting the object, the autonomous floor-cleaning robot may execute one or more behaviors (e.g., a cleaning or navigational behavior). The behavior can be selected or adjusted based on a portion of the autonomous floor-cleaning robot (e.g., a zone) that makes contact with the object. Sensors, such as Hall sensors can be used to detect a portion of the autonomous floor-cleaning robot that makes contact with the object. The inventors have recognized, among other things, a need for a autonomous floor-cleaning robot having an improved ratio of a number of zones to a number of sensors.

In certain autonomous floor-cleaning robots, a number of Hall sensors can be used to sense contact in a corresponding number of spatial regions in a bumper of the autonomous floor-cleaning robot. The inventors have recognized, among other things, that an orientation of Hall sensors can be adjusted to increase a number of spatial regions or zones for a fixed number of Hall sensors, thus providing improved performance without the need for additional sensors.

In some embodiments, a mobile robot comprises a robot body; a drive system supporting the robot body above a floor surface for maneuvering the robot across the floor surface; a bumper frame on a front periphery of the robot body, the bumper frame supported by the robot body; and a bumper impact system comprising: a first sensor at a first orientation with respect to the bumper frame that is configured to generate a first signal in response to a magnitude and a direction of movement of the bumper frame relative to the robot body; a second sensor at a second orientation with respect to the bumper frame that is configured to generate a second signal in response to a magnitude and a direction of movement of the bumper frame relative to the robot body, the second orientation being different from the first orientation; and a processor configured to receive the first and second signals from the first and second sensors and to generate an impact profile of a bumper impact event based on the first and second signals responsive to the bumper frame being moved with respect to the robot body.

In some embodiments, the first sensor comprises a first Hall effect sensor coupled to one of the bumper frame or the robot body and a first magnet coupled to the other of the bumper frame or the robot body such that the first Hall effect sensor generates the first signal in response to the bumper frame moving with respect to the robot body; and the second sensor comprises a second Hall effect sensor coupled to one of the bumper frame or the robot body and a second magnet coupled to the other of the bumper frame or the robot body such that the second Hall effect sensor generates the second signal in response to the bumper moving with respect to the robot body. In some embodiments, the first and second magnets are coupled to the bumper and the first and second Hall effect sensors are coupled to the robot body.

In some embodiments, the first orientation of the first sensor corresponds to a first magnetic pole orientation of the first magnet, and the second orientation of the second sensor corresponds to a second magnetic pole orientation of the second magnet, the first magnetic pole orientation and the second magnetic pole orientation having an offset angle therebetween. In some embodiments, the offset angle of the first magnetic pole orientation and the second magnetic pole orientation comprises about 90 degrees. In some embodiments, the first and second magnetic pole orientations of the first and second magnets are oriented about 30-60 degrees or about 45 degrees offset from a major axis of a front edge periphery of the robot body.

In some embodiments, the processor is configured to identify a region of impact based on the impact profile of a bumper impact event.

In some embodiments, the processor is configured to determine a position or region of impact on the bumper frame based on a relative strength of the first and second signals.

In some embodiments, the processor is configured to determine a force of impact on the bumper frame based on a signal strength of the first and second signals.

In some embodiments, the processor is configured to define at least five impact regions of the bumper based on signal profile ranges for the first and second signals, and to identify one of the impact regions for a bumper impact event based on the signal profile ranges for the first and second signals.

In some embodiments, the processor is configured to identify a location of an obstacle based on the position or region of impact on the bumper frame.

In some embodiments, a method of operating a mobile robot is provided. The mobile robot includes a robot body, a drive system supporting the robot body above a floor surface for maneuvering the robot across the floor surface, and a bumper frame on a front periphery of the robot body. The method includes receiving a first signal from a first sensor positioned at a first orientation with respect to the bumper frame, the first signal being responsive to motion of the bumper frame relative to the robot body; receiving a second signal from a second sensor at a second orientation with respect to the bumper frame, the second signal being responsive to motion of the bumper frame relative to the robot body, the second orientation being different from the first orientation; and generating an impact profile of a bumper impact event based on the first and second signals responsive to the bumper frame being moved with respect to the robot body.

In some embodiments, the first sensor comprises a first Hall effect sensor coupled to one of the bumper frame or the robot body and a first magnet coupled to the other of the bumper frame or the robot body such that the first Hall effect sensor generates the first signal in response to the bumper frame moving with respect to the robot body; and the second sensor comprises a second Hall effect sensor coupled to one of the bumper frame or the robot body and a second magnet coupled to the other of the bumper frame or the robot body such that the second Hall effect sensor generates the second signal in response to the bumper moving with respect to the robot body.

In some embodiments, the first and second magnets are coupled to the bumper and the first and second Hall effect sensors are coupled to the robot body.

In some embodiments, the first orientation of the first sensor corresponds to a first magnetic pole orientation of the first magnet, and the second orientation of the second sensor corresponds to a second magnetic pole orientation of the second magnet, the first magnetic pole orientation and the second magnetic pole orientation having an offset angle therebetween.

In some embodiments, the offset angle of the first magnetic pole orientation and the second magnetic pole orientation comprises about 90 degrees.

In some embodiments, the first and second magnetic pole orientations of the first and second magnets are oriented about 30-60 degrees or about 45 degrees offset from a major axis of a front edge periphery of the robot body.

In some embodiments, the method comprises identifying a position or region of impact based on the impact profile of a bumper impact event.

In some embodiments, the method comprises determining a position of impact on the bumper frame based on a relative strength of the first and second signals.

In some embodiments, the method comprises determining a force of impact on the bumper frame based on a signal strength of the first and second signals.

In some embodiments, the method comprises defining at least five impact regions of the bumper based on signal profile ranges for the first and second signals, and identifying one of the impact regions for a bumper impact event based on the signal profile ranges for the first and second signals.

In some embodiments, the method comprises identifying a location of an obstacle based on the position or region of impact on the bumper frame.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF EMBODIMENTS OF THE INVENTION

An autonomous floor-cleaning robot can include Hall sensors that can be used to detect a portion of the autonomous floor-cleaning robot that makes contact with an object, such as a piece of furniture or wall. Detecting the location of the impact is limited by the number of switches and suspension points that economically can be incorporated into the robot's mechanical geometry. For many robots, two switches, a left switch and a right switch, are used. At best, this allows for three detection zones, right, left, and center if both switches are triggered. In addition, such a robot cannot generally determine the degree or force of impact. The inventors have recognized, among other things, that an orientation of Hall sensors can be adjusted to increase a number of spatial regions or zones for a fixed number of Hall sensors, thus providing improved performance without the need for additional sensors. Moreover, a degree and/or force of impact may also be determined in some embodiments.

Figure 1:
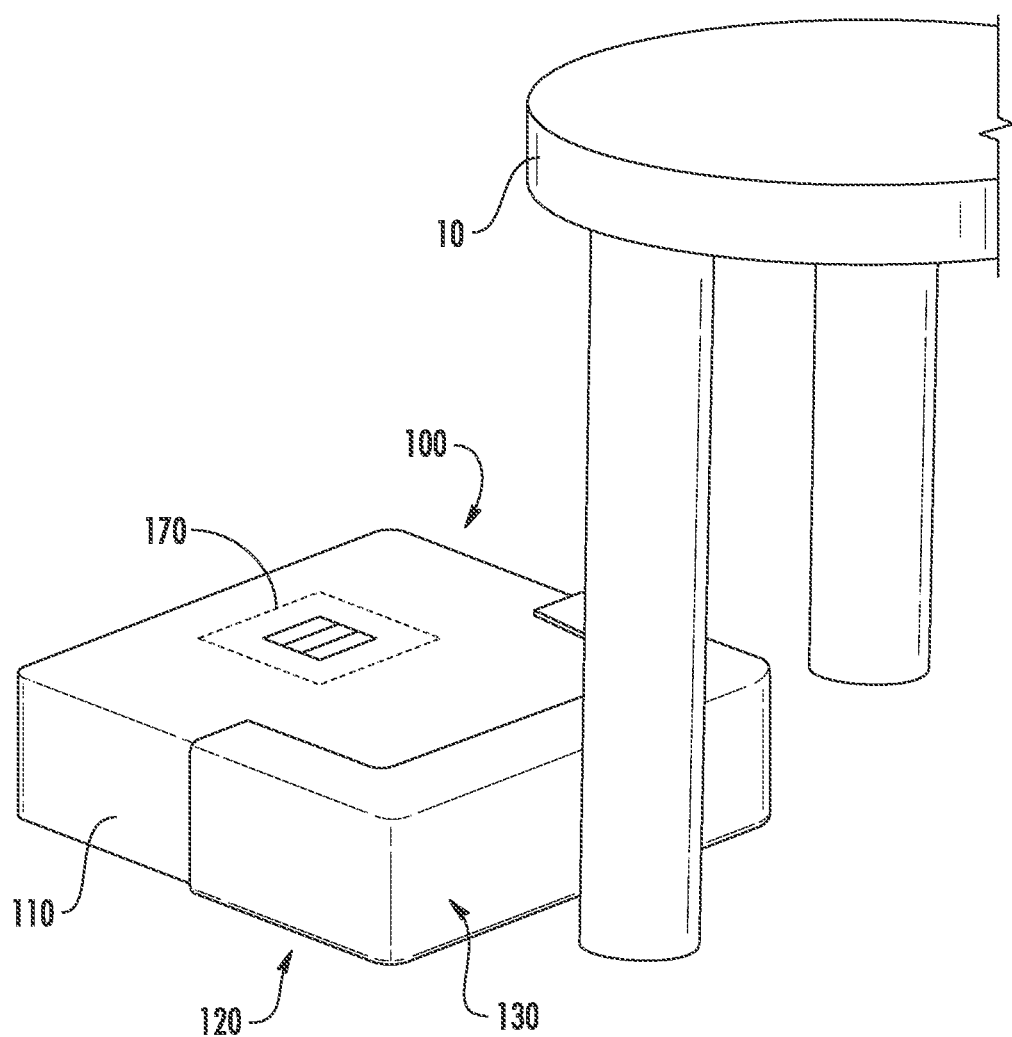
FIG. 1 is a perspective view of a robot contacting an object with a bumper frame according to some embodiments.
Figure 2:
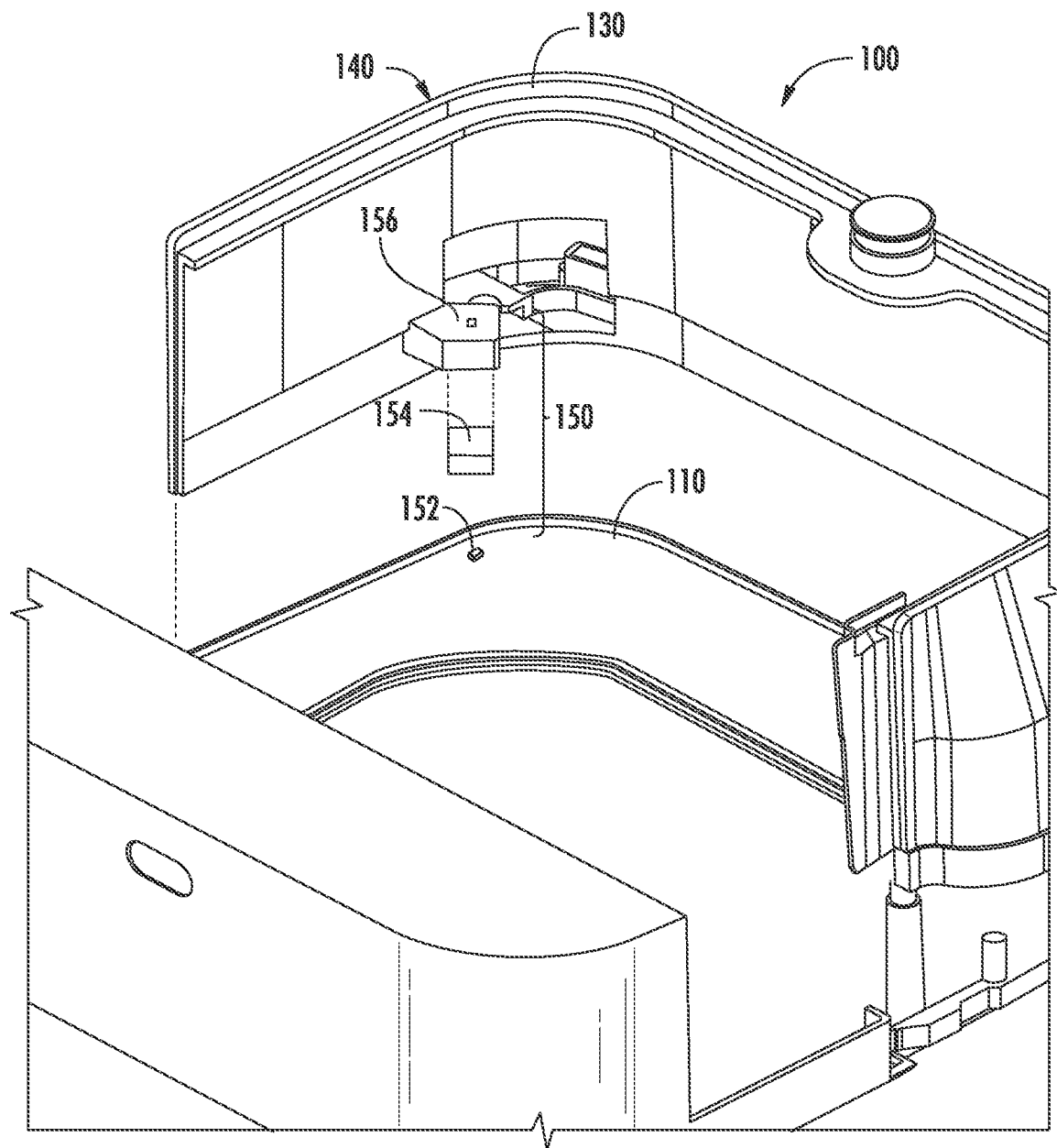
FIG. 2 is an exploded perspective view of the robot of FIG. 1 with the top surface of the robot removed and interior components omitted for clarity, illustrating a sensor unit according to some embodiments.

FIGS. 1 and 2 illustrate a mobile, autonomous floor-cleaning robot 100 having a robot body 110, a drive system 120, and a bumper frame 130 on a front portion of the robot body 110. The drive system 120 supports the robot body 110 above a floor surface for maneuvering the robot 100 across the floor surface. As illustrated in FIG. 1, during use, the bumper frame 130 of the robot 100 may contact an obstacle 10 in the cleaning environment with a given force and at a location on the robot bumper frame 130. Upon contact of the bumper frame 130 with an obstacle 10, the bumper frame 130 moves some distance relative to the robot body 110. Moreover, the bumper frame 130 may move in a direction with respect to the robot body 110 (e.g., front-back, side-side, diagonally) depending on the location of the impact.

The robot 100 also includes a processor 170 that is configured to execute various robot control actions and/or receive and analyze information from sensors on the robot 100, including various sensors described herein. The processor 170 may also include mapping capabilities for analyzing information from sensors on the robot 100 to create or update a map of the environment using techniques such as Simultaneous Localization and Mapping (SLAM), for example, as described in U.S. Pat. No. 9,886,037.

Figure 3:
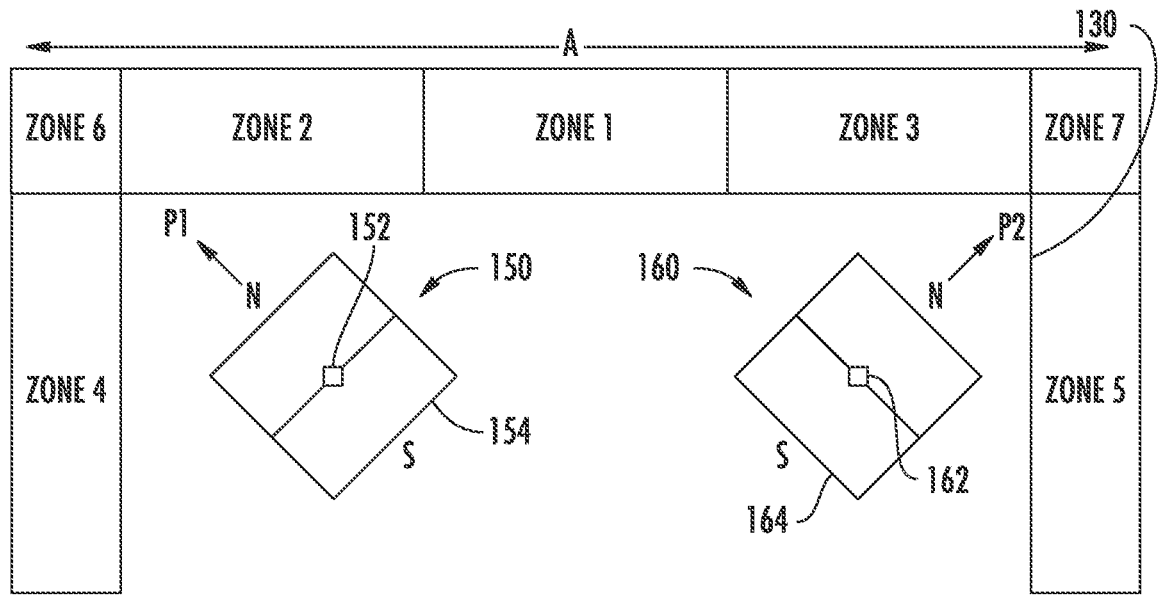
FIGS. 3-10 are schematic diagrams of a top view of a sensor unit and bumper frame according to some embodiments.

As shown in FIGS. 2 and 3, the robot 100 includes a bumper impact system 140 having two sensor units 150, 160, each at a different orientation with respect to the bumper frame 130. As illustrated, the sensor unit 150 includes a magnetic field sensor or Hall effect sensor 152 coupled to robot body 110 and a magnet 154 with a magnetic field polarity P1 coupled to the bumper frame 130, and the sensor unit 160 includes a magnetic field sensor or Hall effect sensor 162 coupled to robot body 110 and a magnet 164 with a magnetic field polarity P2 coupled to the bumper frame 130. As illustrated, the sensor 154 is mounted on the bumper frame 130 with a magnet receptacle 156, and the magnet 164 may be similarly mounted on the bumper frame 130 with a corresponding magnetic receptacle (not shown) on the opposite side of the bumper frame 130. In this configuration, when the bumper frame 130 moves with respect to the robot body 110 upon contact with an obstacle, the magnets 154, 164 move with respect to the corresponding Hall effect sensors 152, 162. The resulting change in magnetic field generates signals at the Hall effect sensors 152, 162 that are responsive to the movement of the bumper frame 130.

As illustrated in FIG. 3, the Hall Effect sensors 152, 162 are positioned along a central axis of the respective magnet 154, 164 and the direction of the polarity P1 of the magnet 154 is at about a ninety degree angle from the direction of the polarity P2 of the magnet 164 with the magnets 154, 164 generally facing respective corners of the bumper frame 130. That is, the magnet 154 is at an orientation that is offset from the plane of the front surface of the bumper frame 130 and the forward direction of movement of the robot 100 by about 45 degrees in a first direction, and the magnet 164 is at an orientation that is offset from the plane of the front surface of the bumper 130 by about 45 degrees in a second direction that is opposite the first direction. Each of the Hall effect sensors 152, 162 is configured to generate a signal that is responsive to the magnitude and direction of movement of the bumper frame 130 relative to the robot body 110. The sensor units 150, 160 are at different orientations such that each of the Hall effect sensors 152, 162 detect a different respective change in the magnetic field from the magnets 154, 164 due to movement of the bumper frame 130 in response to an impact location. Accordingly, the signals generated by the Hall effect sensors 152, 162 may be used to identify a location or impact zone of an impact on the bumper frame 130.

The Hall effect sensors 152, 162 are typically most sensitive to movement of the magnets 154, 164 along the direction of the polarity P1, P2 of the magnets 154, 164. That is, the Hall effect sensors 152, 162 generate a larger signal when the magnets 154, 164 move along the direction of the polarity P1, P2 of the magnets 154, 164. By offsetting the angle of the magnets 154, 164 with respect to one another, the sensitivity of the Hall sensors 152, 162 to identify locations of impact based on different movements of the bumper frame 130 may be increased. In this configuration, the impact profile based on the characteristic signals or ranges of signals corresponding to an impact location or region may be identified with sufficient precision to localize an impact in more than three bumper locations. In some embodiments, five, seven or nine or more bumper locations may be identified, and in some embodiments, a coordinate location of an impact may be identified to within 1, 5, 10, 15, or 20 cm or less.

Although the Hall effect sensors 152, 162 are illustrated as being positioned along a central axis of the respective magnet 154, 164, it should be understood that the location of the Hall effect sensors 152, 162 may be offset from the center of the respective magnets 154, 164 and/or offset with respect to the polarity P1, P2 of the respective magnets. Offsetting the magnets 154, 164 may reduce or avoid signal saturation of the respective Hall effect sensors 154, 164. Thus, the Hall effect sensors 152, 162 may be positioned at any suitable location so that changes in the magnetic field may be sensed due to movement of the magnets 154, 164 due to movement of the bumper frame 130. In addition, the magnets 154, 164 are illustrated as being mounted on the bumper frame 130 by the magnet receptacle 156 and the Hall effect sensors 152, 162 are mounted on the robot body 110; however, any suitable location may be used to detect changes in magnetic field due to movement of the bumper frame 130. In some embodiments, the Hall effect sensors 152, 162 may be mounted on the bumper frame 130 and the magnets 154, 164 may be mounted on the robot body 110. Moreover, the offset angle between the directions of the magnetic field polarities P1 and P2 is illustrated at about 90 degrees; however, different offset angles may be used, such as between 70 degrees and 110 degrees. The magnetic pole orientations or polarities P1, P2 may be oriented about 45 degrees offset from a major axis A of a front edge periphery of the robot body 110 (or the plane of the front surface of the bumper frame 130); however, offsets of between about 30 and 60 degrees from the plane of the front surface of the bumper frame 130 may be used.

Figure 14:
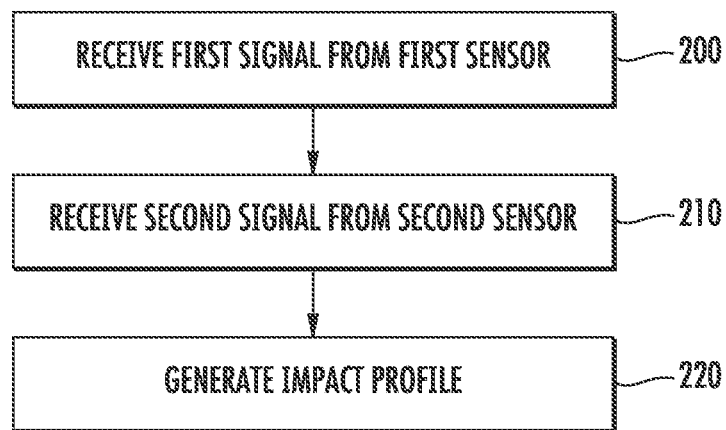
FIG. 14 is a flowchart of a method according to some embodiments.

With reference to FIG. 14, a first signal is received from the first Hall effect sensor 152 at Block 200, and a second signal is received from the second Hall effect sensor 162 at Block 210. The first and second signals may be received by the processor 170 (FIG. 1), and the processor 170 may generate an impact profile of a bumper impact event based on the first and second signals from the sensors 152, 162 responsive to the bumper frame 130 being moved with respect to the robot body 110 at Block 220. In particular, the processor 170 may determine or estimate a position or region of impact based on characteristic signals or ranges of signals from the Hall effect sensors 152, 162. In some embodiments, the position or region of impact may be based on a relative strength of the signals from the respective sensors 152, 162. For example, an impact in zone 2 as shown in FIG. 3 would result in a larger signal in the Hall effect sensor 152 than in the Hall effect sensor 162 due to greater movement of the bumper frame 130 closer to the sensor 152. It should be understood that the processor 170 may be located on the robot 100 as shown; however, in some embodiments, the signals from the robot sensors 152, 162 may be transmitted to a remote processor for further analysis to generate an impact profile of a bumper impact event as described herein.

Figure 11:
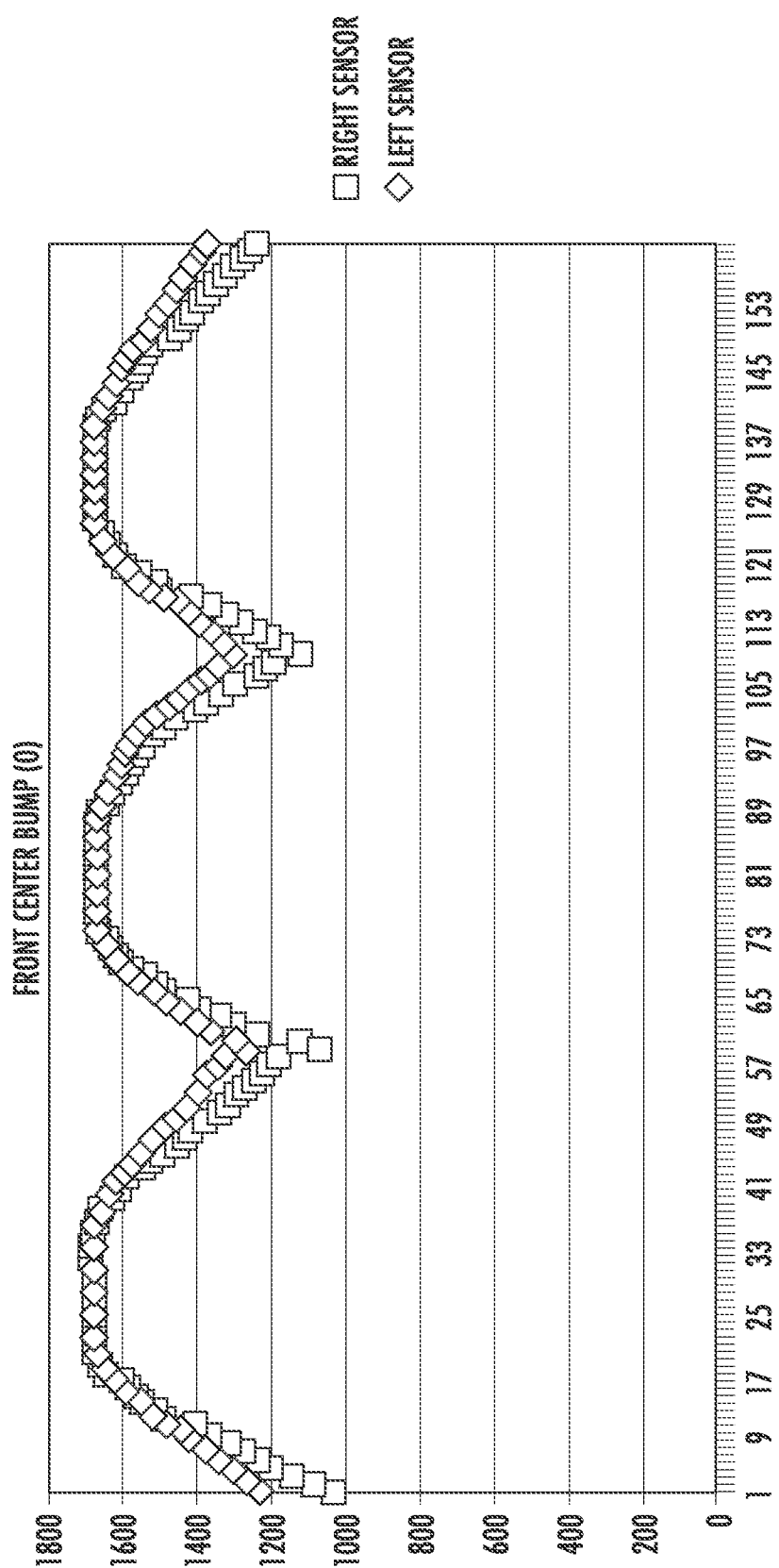
FIGS. 11 and 12 are graphs of example signals for bumper frame impacts at the impact locations shown in FIGS. 4 and 5, respectively.
Figure 12:
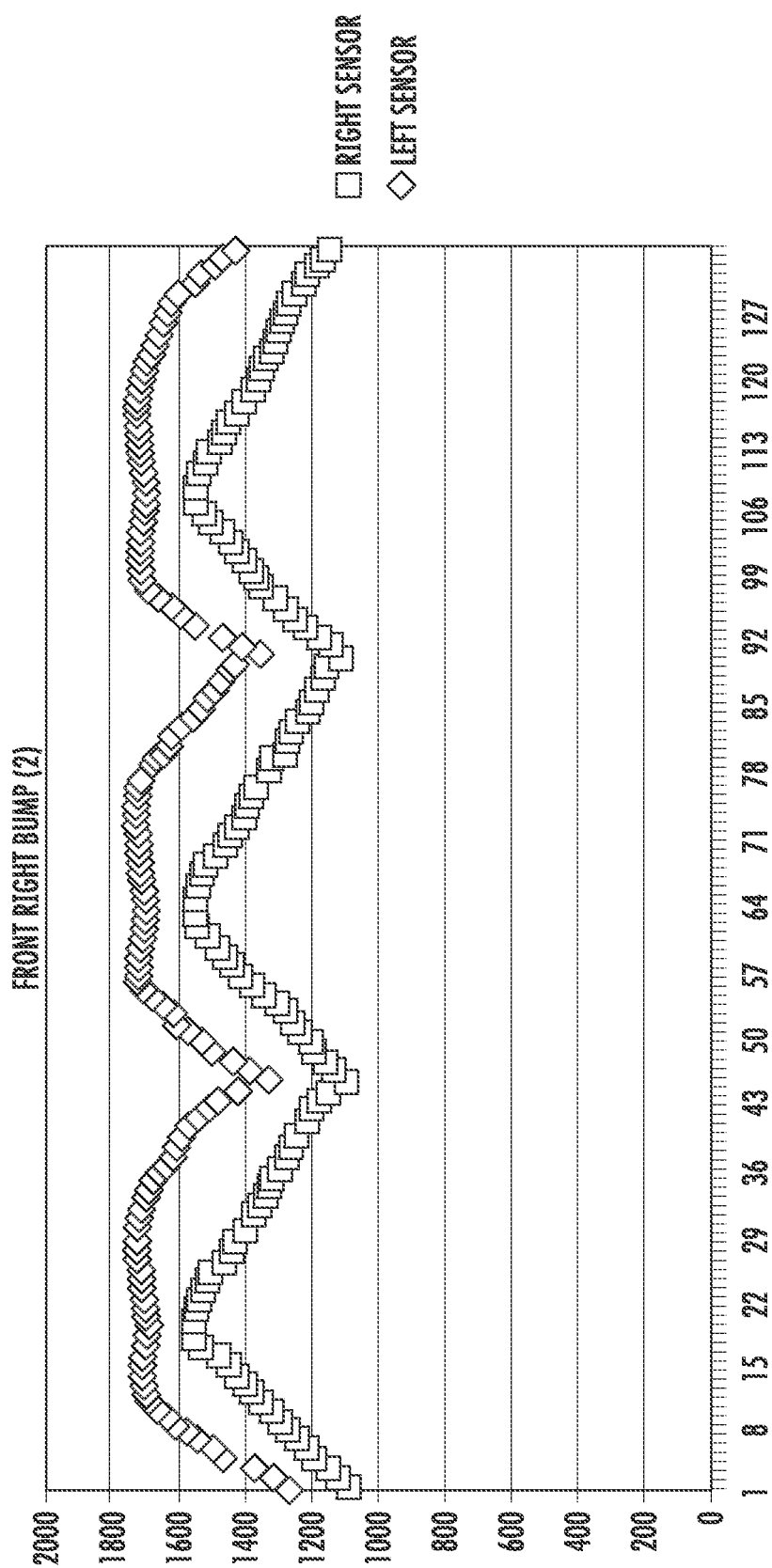

The impact profile or characteristic signals or ranges of signals corresponding to an impact location or region may be experimentally determined based on actual impact signals, which may be stored in a memory of the processor 170. Example signals are shown in FIGS. 11 and 12. In some embodiments, the characteristic signals or ranges of signals corresponding to an impact location or region may be generated by a simulation. Moreover, a signal strength or rate of change of the signal of the sensors 152, 162 may be used to determine a force of impact on the bumper frame.

Various non-limiting examples according to some embodiments are described below.

Figure 4:
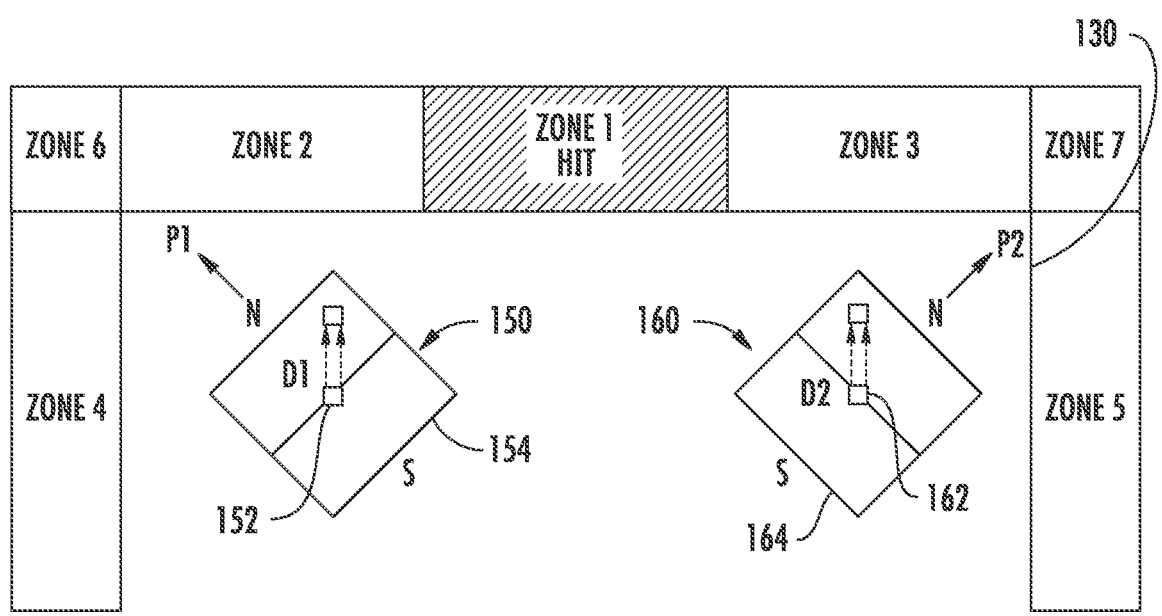

Impact regions or zones 1-7 are illustrated in FIGS. 3-10. As shown in FIG. 4, a hit or impact in zone 1, which is in the front and central region of the bumper frame 130 results in movement of the magnet 154 with respect to the Hall effect sensor 152 by a distance D1 and movement of the magnet 164 with respect to the Hall effect sensor 162 by a distance D2. Because the impact is in the central region or zone 1, the amount of movement at each of the sensors 152, 162 is about the same, i.e., D1 is about the same as D2. This results in two signals from the sensors 152, 162 that are about the same. An example graph of the signals is shown in FIG. 11 for a front, center or zone 1 impact on the bumper frame 130.

Figure 5:
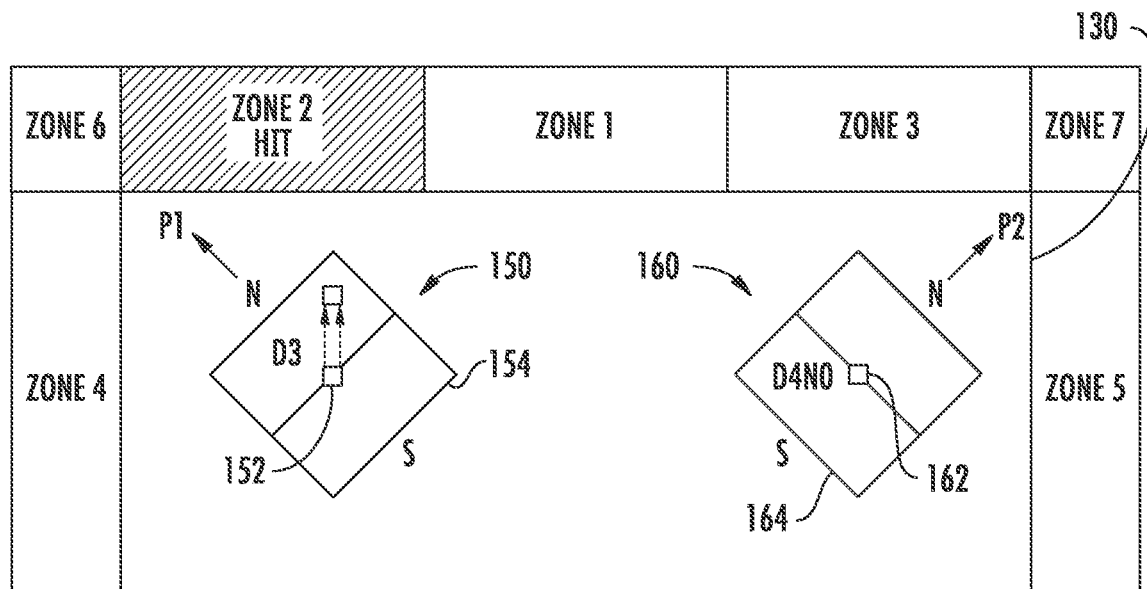
Figure 6:
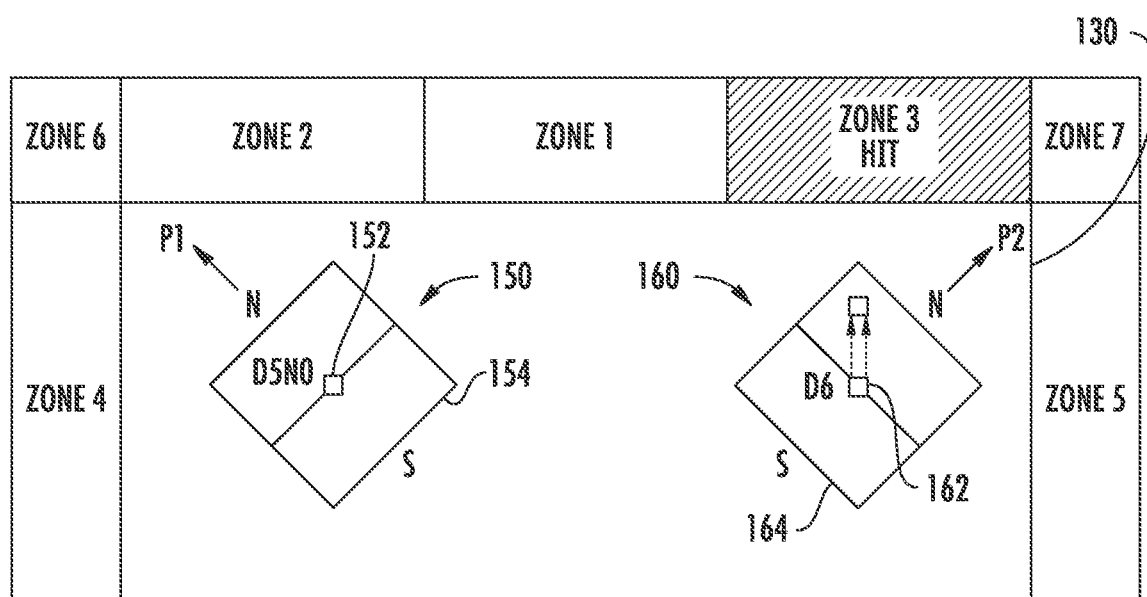

A front, left or zone 2 impact on the bumper frame 130 is illustrated in FIG. 5. As shown, the relative movement of the magnet 154 with respect to the sensor 152 is a distance D3, while the relative movement of the magnet 164 with respect to the sensor 162 is D4, which is negligible or zero. An example graph of the signals is shown in FIG. 12 for a front, left or zone 2 impact on the bumper frame 130. FIG. 6 illustrates respective relative movements at distances D5 (negligible or zero) and D6 for an impact in the front, right or zone 3. As illustrated in FIG. 6, opposite movement of the magnets 154, 164 and sensors 152, 162 from FIG. 5 are shown due to the impact in the opposite side of the bumper frame 130.

Figure 7:
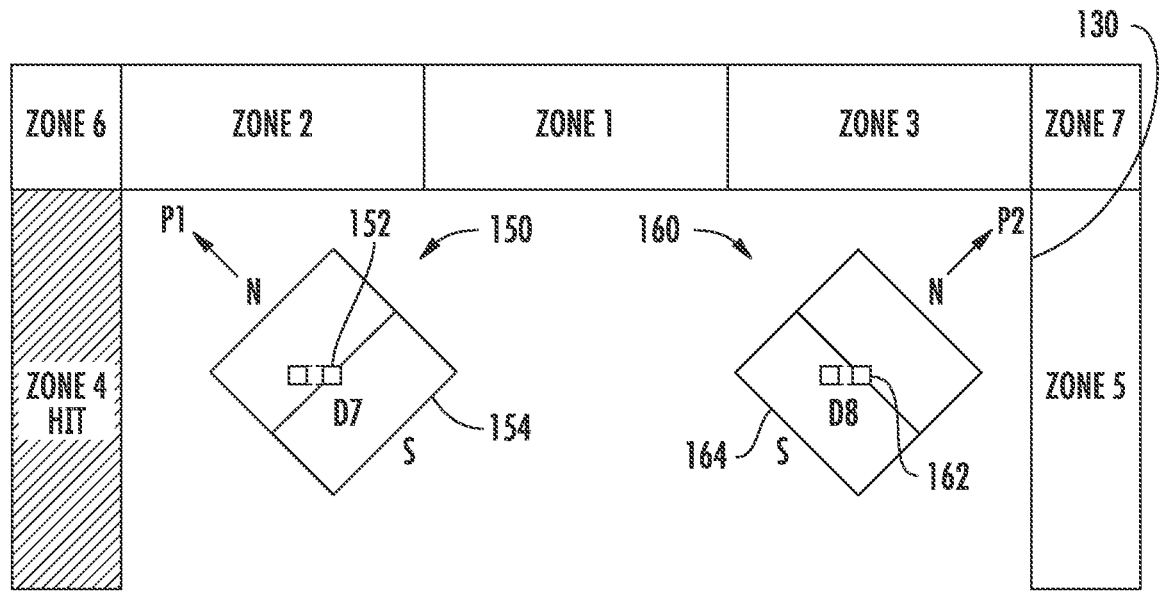
Figure 8:
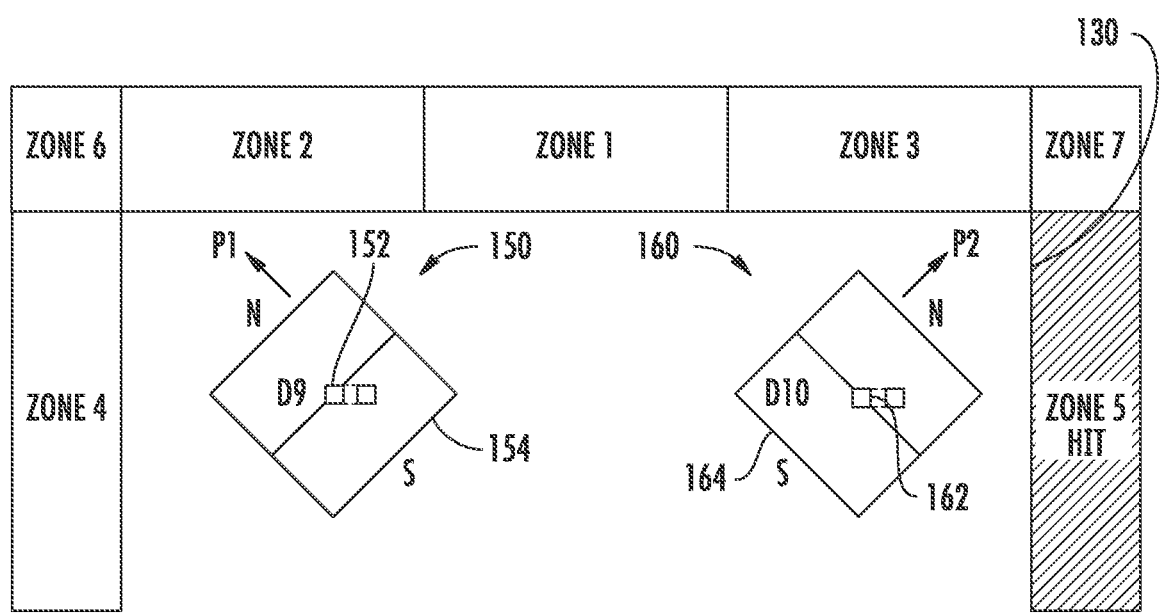

FIG. 7 illustrates a left, side or zone 4 impact with relative sensor movement in a horizontal direction a distance D7, D8. FIG. 8 illustrates a right, side or zone 5 impact with relative sensor movement in a horizontal direction a distance D9, D10. The signals from the sensors 152, 162 due to the relative movement shown in FIGS. 7 and 8 may be used to identify the relevant impact zone.

Figure 9:
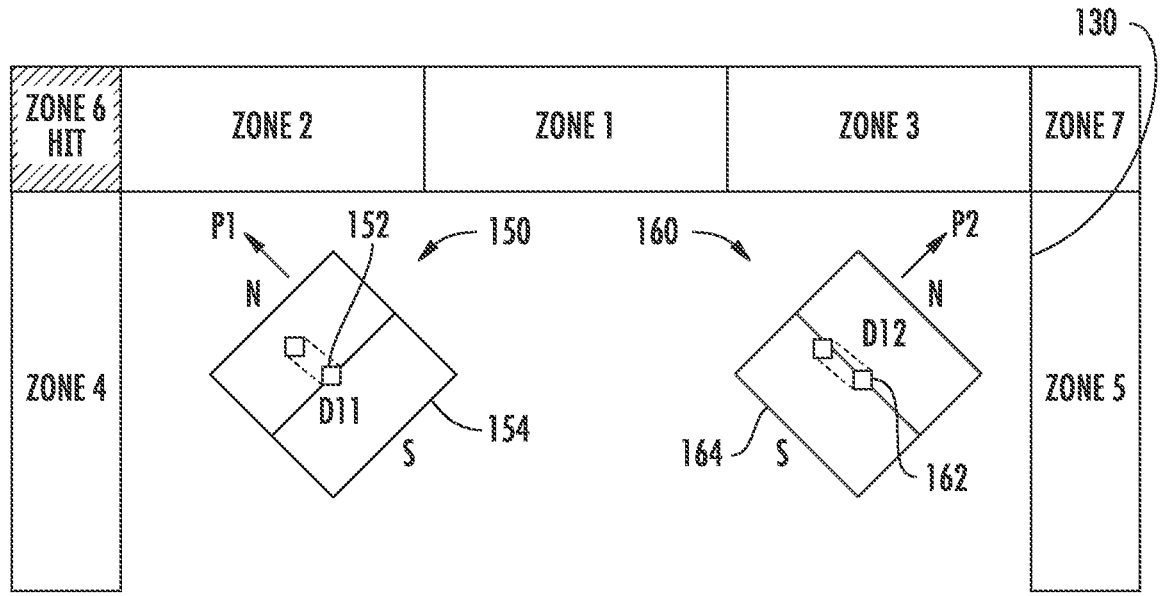
Figure 10:
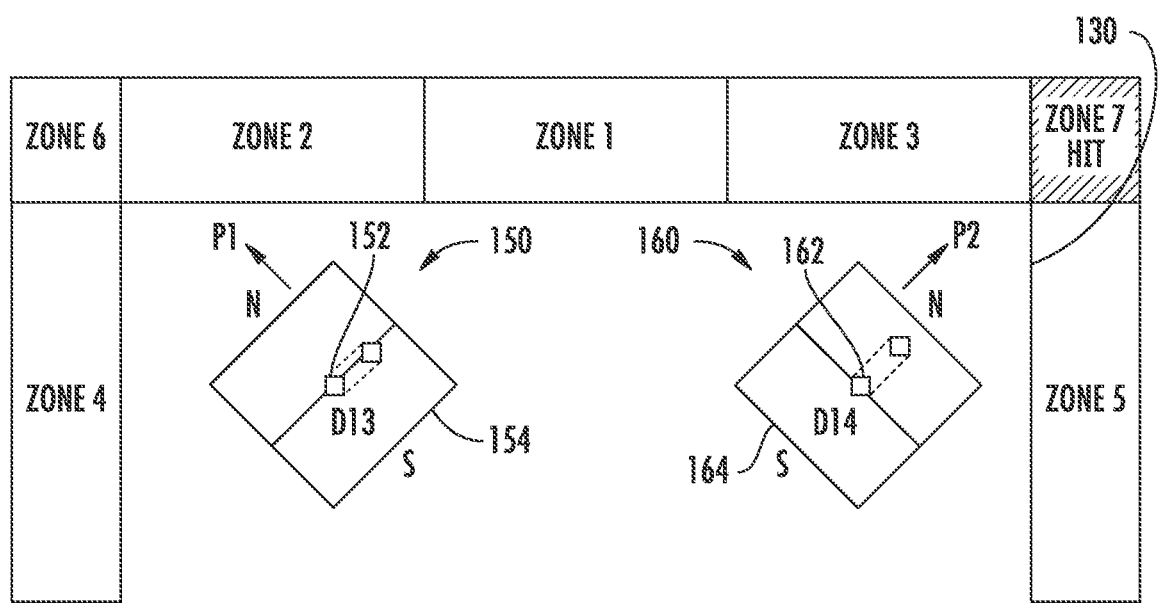

FIG. 9 illustrates a left, corner or zone 6 impact with relative sensor movement in a diagonal direction a distance D11, D12. FIG. 10 illustrates a right, corner or zone 7 impact with relative sensor movement in a horizontal direction a distance D13, D14. The signals from the sensors 152, 162 due to the relative movement shown in FIGS. 9 and 10 may be used to identify the relevant impact zone.

As discussed above, although the bumper frame 130 is illustrated as being divided into seven impact zones, it should be understood that any number of impact zones may be used, such as from three impact zones to ten or twenty impact zones. By using two sensors in the configurations described herein, forces applied to the bumper frame 130 may be divided into at least five zones.

In some embodiments, an impact profile for an impact event is based on a threshold level of the sensor reading at a given time or during a time interval. For example, a maximum reading from the signal generated by the sensors 152, 162 may be determined at a given time or time interval. The processor 170 may store a value for various thresholds, which can be used to classify a location of an impact event. The thresholds may be set based on actual data from known impacts for classification purposes or based on simulated or calculated values.

In some embodiments, three threshold values may be identified based on sensor values: a high threshold (T(2)), a low threshold (T(1)) and a negative threshold (T(−1)) of the sensor value for each sensor 152, 162. In this example, the negative threshold (T(−1)) indicates that the bumper moves slightly backwards in relationship to the sensor. The three thresholds for each sensor results in nine different combinations of thresholds, which may be used to divide the values into nine different zones as shown in the following Table 1. A high sensor value (greater than T(2)) on both of the sensors is a Zone 1 impact. A low sensor value (greater than T(1), but less than T(2)) are Zone 2 and Zone 3 impacts. Negative threshold values (less than T(−1)) occur during a Zone 4 or Zone 5 impact in which the side of the bumper opposite the impact travels backwards slightly.

TABLE 1

| ZONE | LEFT SENSOR (LS) | RIGHT SENSOR (RS) |
| --- | --- | --- |
| 1 (FRONT CENTER) | LS > T(2) | RS > T(2) |
| 2 (FRONT LEFT) | LS > T(2) | RS > T(1) |
| 3 (FRONT RIGHT) | LS > T(1) | RS > T(2) |
| 4 (LEFT SIDE) | LS > T(1) | RS < T(−1) |
| 5 (RIGHT SIDE) | LS < T(−1) | RS > T(1) |
| 6 (LEFT CORNER) | T(−1) < LS < T(1) | RS > T(1) |
| 7 (RIGHT CORNER) | LS > T(1) | T(−1) < RS < T(1) |

It should be understood that any suitable number of threshold values may be used to divide the bumper into a corresponding number of zones. For example, in some embodiments, an eighth zone located below Zone 4 opposite Zone 6 and a ninth zone located below Zone 5 opposite Zone 6 may be defined by the following sensor conditions shown in Table 2:

TABLE 2

| ZONE | LEFT SENSOR (LS) | RIGHT SENSOR (RS) |
| --- | --- | --- |
| 8 | LS < T(−1) | RS < T(1) |
| 9 | LS < T(1) | RS < T(−1) |

Figure 13:
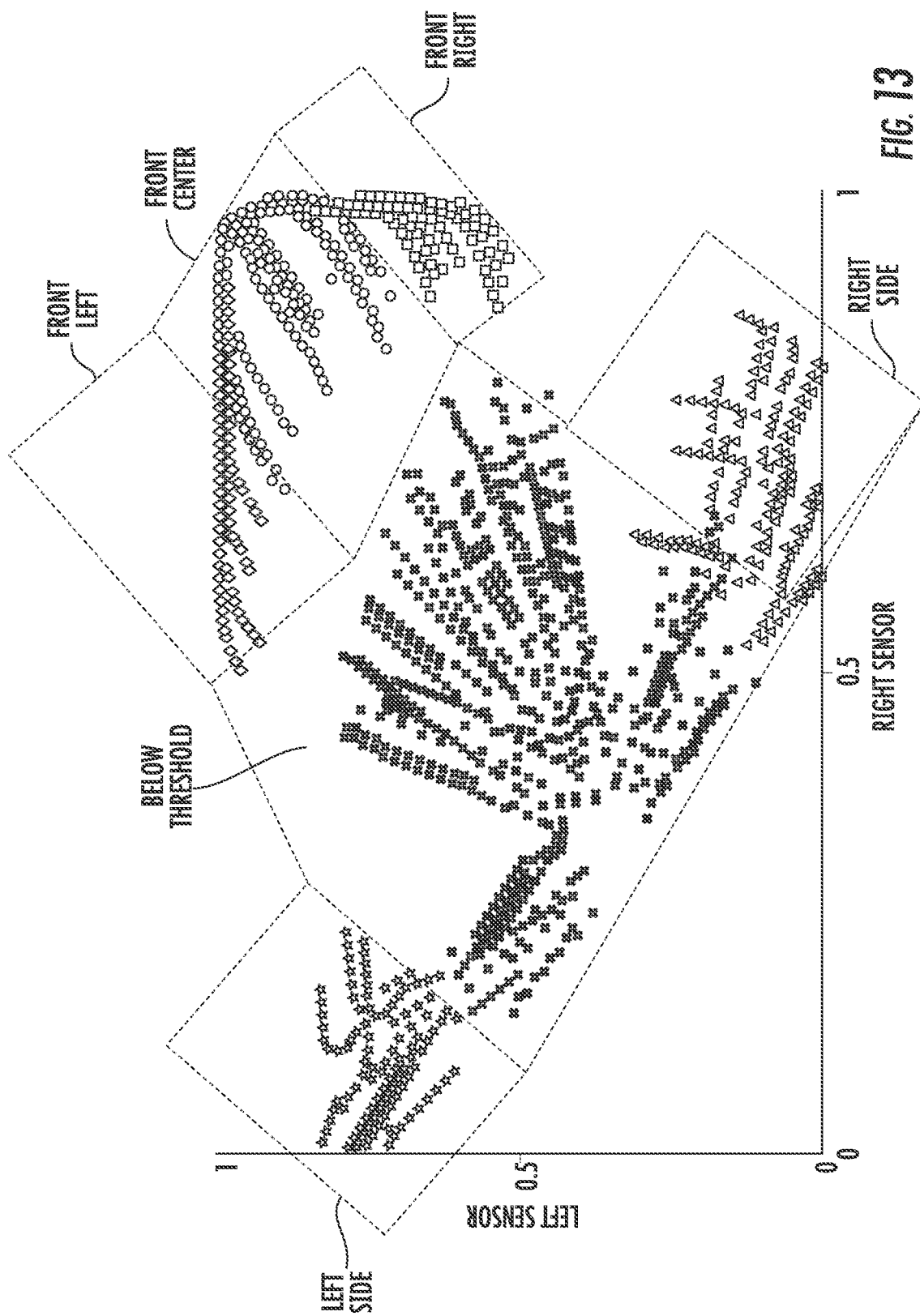
FIG. 13 is a plot of data from a bumper impact simulation.

An example graph illustrating bumper impact data is shown in FIG. 13. The maximum values of the right and left sensor 152, 162 for each bumper impact are normalized and divided into five regions or gates for the front central zone, the right and left front zone, and a right and left side zone. The central portion of data points are below a chosen threshold where sensor readings indicate a force that is likely too small to be due to an impact on the bumper. In order to generate the data, multiple force/displacements were performed at each push point along the bumper. These force/displacements and corresponding sensor readings were used to build a model or graph that correlates bumper positions with the expected responses from each of the Hall effect sensors 152, 162. The data shown in FIG. 13 may be further used in a trainer or machine learning engine to develop predictions of what sensor readings correspond to impacts on the respective zones of the bumper.

The data shown in FIG. 13 is combined with a calibration of the robot which determines where the minimum and maximum values are for each of the Hall effect sensors. A user may actuate the bumper in different directions to determine the highest and lowest analog values of the sensors 152, 162. The sensor values at the various locations of the bumper are then normalized to the actual minima/maxima values of the robot to generate the plot shown in FIG. 13.

The collection of the data shown in FIG. 13 may be collected by an automated test in which plungers press on the bumper with a given force at different locations. An example of a subset of data collected by an automated bumper test using automated plunger pushes is provided below in Table 2. It should be understood that the following data set is an example and that additional data is typically needed to provide a more accurate and robust model of the bumper impacts.

TABLE 2

| POSITION | FORCE | LEFT SENSOR | RIGHT SENSOR |
| --- | --- | --- | --- |
| 0 | 0.11 | 861 | 708 |
| 0.02 | 0.12 | 873 | 695 |
| 0.06 | 0.14 | 885 | 682 |
| 0.1 | 0.16 | 897 | 671 |
| 0.14 | 0.18 | 910 | 657 |
| 0.18 | 0.19 | 921 | 647 |

Once the data in FIG. 13 is collected and the threshold gates or plot regions corresponding to the different bumper regions are defined, new bumper impact data may be analyzed. The processor of the robot can receive bumper impact data from the sensors 152, 162 of the robot and classify the impact data, for example, based on which region of the plot in FIG. 13 the impact falls into. The identified impact zone may further be used to identify a location of an obstacle that the robot is contacting with the bumper. The location of the obstacle may be used too create or update a map of the environment using techniques such as Simultaneous Localization and Mapping (SLAM), for example, as described in U.S. Pat. No. 9,886,037.

Although embodiments according to the invention are illustrated with respect to two sensors, it should be understood that three or more sensors may be used.

The present invention is described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable non-transient storage medium having computer-usable or computer-readable program code embodied in the medium for use by or in connection with an instruction execution system.

The computer-usable or computer-readable medium may be, for example but not limited to, an electronic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

The foregoing is illustrative of the present invention and is not to be construed as limiting thereof. Although a few example embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A mobile cleaning robot comprising:
a robot body;
a bumper connected to and supported by the robot body; and
a bumper impact system comprising:
a first sensor connected to the body in a first orientation with respect to the body and the bumper; and
a second sensor connected to the body in a second orientation with respect to the body and the bumper different from the first orientation, the first sensor and the second sensor together configured to sense an impact region of the bumper based on a magnitude and a direction of movement of the bumper relative to the robot body, wherein a number of impact regions is greater than two.

2. The mobile robot of claim 1, wherein the number of impact regions is greater than four.

3. The mobile robot of claim 1, wherein:
the first sensor includes a first Hall effect sensor connected to the bumper and a first magnet coupled to the robot body; and
the second sensor comprises a second Hall effect sensor connected to the bumper and a second magnet coupled to the bumper.

4. The mobile robot of claim 3, wherein the first orientation of the first sensor corresponds to a first magnetic pole orientation of the first magnet, and the second orientation of the second sensor corresponds to a second magnetic pole orientation of the second magnet, the first magnetic pole orientation and the second magnetic pole orientation having an offset angle therebetween.

5. The mobile robot of claim 4, wherein the offset angle is between 70 degrees and 100 degrees.

6. The mobile robot of claim 4, wherein the offset angle is 90 degrees.

7. The mobile robot of claim 6, wherein the first and second magnetic pole orientations of the first and second magnets are oriented about 45 degrees offset from a major axis of a front edge periphery of the robot body.

8. The mobile robot of claim 1, wherein the first sensor produces a first impact signal based on the magnitude and the direction of movement of the bumper relative to the robot body, and wherein the second sensor produces a second impact signal based on the magnitude and the direction of movement of the bumper relative to the robot body.

9. The mobile robot of claim 8, further comprising:
a processor configured to determine the impact region on the bumper based on the first sensor signal and the second sensor signal.

10. The mobile robot of claim 9, wherein the processor is configured to determine the impact region on the bumper based on a relative strength of the first and second signals.

11. A mobile cleaning robot comprising:
a robot body;
a bumper frame located on a front periphery of the robot body, the bumper frame supported by the robot body; and
a plurality of bumper impact sensors connected to the body, the plurality of bumper impact sensors arranged in a plurality of orientations with respect to the body and the bumper frame that are different from each other, the plurality of bumper impact sensors together configured to sense an impact region of the bumper based on a magnitude and a direction of movement of the bumper frame relative to the robot body, where a number of impact regions is greater than a number of sensors of the plurality of sensors.

12. The mobile robot of claim 11, wherein at least one sensor of the plurality of bumper impact sensors includes a Hall effect sensor connected to one of the bumper frame or the robot body, and includes a first magnet connected to the other of the bumper frame or the robot body.

13. The mobile robot of claim 12, wherein the magnet is connected to the bumper and the Hall effect sensors is connected to the robot body.

14. The mobile robot of claim 11, wherein the plurality of bumper impact sensors includes two bumper impact sensors.

15. The mobile robot of claim 14, wherein the number of impact regions is greater than four.

16. The mobile robot of claim 15, further comprising:
a processor configured to determine the impact region on the bumper frame based a plurality of bumper impact signals produced by the plurality of bumper impact sensors based on the magnitude and the direction of movement of the bumper frame relative to the robot body.

17. A method of operating a mobile robot, the mobile robot comprising a robot body and a bumper frame on a front periphery of the robot body, the method comprising:
producing, based on motion of the bumper frame relative to the robot body, a first signal from a first sensor at a first orientation with respect to the bumper frame;
producing, based on motion of the bumper frame relative to the robot body, a second signal from a first sensor at a second orientation with respect to the bumper frame, the first orientation different from the second orientation; and
determining, based on the first signal and the second signal, a region of the bumper frame impacted, wherein a number of regions of the bumper frame is greater than two.

18. The method of claim 17, wherein:
the first sensor includes a first Hall effect sensor connected to the bumper and a first magnet coupled to the robot body; and
the second sensor comprises a second Hall effect sensor connected to the bumper and a second magnet coupled to the bumper.

19. The method of claim 17, wherein:
the first Hall effect sensor generates the first signal in response to the bumper frame moving with respect to the robot body; and
the second Hall effect sensor generates the second signal in response to the bumper moving with respect to the robot body.

20. The method of claim 19, wherein the first orientation of the first sensor corresponds to a first magnetic pole orientation of the first magnet, and the second orientation of the second sensor corresponds to a second magnetic pole orientation of the second magnet, the first magnetic pole orientation and the second magnetic pole orientation having an offset angle therebetween.

21. The method of claim 20, wherein the offset angle is 90 degrees.

* * * * *